US012687678B2

(12) United States Patent
Pescarmona et al.

(10) Patent No.: US 12,687,678 B2
(45) Date of Patent: Jul. 21, 2026

(54) ROTATING BEAM SWITCH

(71) Applicant: nLIGHT, Inc., Camas, WA (US)

(72) Inventors: Francesco Pescarmona, Camas, WA (US); Giammarco Rossi, Camas, WA (US)

(73) Assignee: NLIGHT, INC., Camas, WA (US)

( * ) Notice: Subject to any disclaimer, the term of this patent is extended or adjusted under 35 U.S.C. 154(b) by 199 days.

(21) Appl. No.: 18/563,816

(22) PCT Filed: May 12, 2022

(86) PCT No.: PCT/US2022/028974
§ 371 (c)(1),
(2) Date: Nov. 22, 2023

(87) PCT Pub. No.: WO2022/250972
PCT Pub. Date: Dec. 1, 2022

(65) Prior Publication Data
US 2024/0241321 A1 Jul. 18, 2024

Related U.S. Application Data

(60) Provisional application No. 63/194,665, filed on May 28, 2021.

(51) Int. Cl.
*G02B 6/35* (2006.01)
*G02B 26/08* (2006.01)
*G02B 26/10* (2006.01)

(52) U.S. Cl.
CPC ......... *G02B 6/3512* (2013.01); *G02B 6/3528* (2013.01); *G02B 26/0891* (2013.01); *G02B 26/105* (2013.01)

(58) Field of Classification Search
CPC ........................... G02B 6/3512; G02B 6/3528; G02B 26/0891; G02B 26/105
See application file for complete search history.

(56) References Cited

U.S. PATENT DOCUMENTS

| | | | |
|---|---|---|---|
| 4,626,066 A | 12/1986 | Levinson | |
| 9,435,998 B1 * | 9/2016 | Bibas | ..................... B41J 3/4073 |

(Continued)

FOREIGN PATENT DOCUMENTS

| | | |
|---|---|---|
| CN | 105891967 A | 8/2016 |
| CN | 210609363 U | 5/2020 |

OTHER PUBLICATIONS

International Search Report dated Aug. 18, 2022, for International Patent Application No. PCT/US2022/028974.

(Continued)

*Primary Examiner* — Tina Wong
(74) *Attorney, Agent, or Firm* — Wiley Rein LLP

(57) ABSTRACT

An apparatus may steer an optical beam provided by a collimating optical module to a selected one of receiving optical modules. The apparatus may comprise an optical component to receive the optical beam provided by the collimating optical module; and a motorized rotation stage including a base and a rotating section, wherein the rotating section is restricted to rotation, relative to the base, about a single axis; wherein the optical component is mounted to the rotating section, and the apparatus further includes circuitry to control the motorized rotation stage to rotate the platform or stage amongst different rotational positions that correspond to the receiving optical modules, respectively; and wherein the optical component guides (by reflection, refraction, or the like, or combinations thereof) the optical beam to the selected one of the receiving optical modules based on a current rotational position of the rotating section. Other embodiments may be disclosed/claimed.

16 Claims, 16 Drawing Sheets

(56)  References Cited

U.S. PATENT DOCUMENTS

| | | | | |
|---|---|---|---|---|
| 9,946,030 | B1 | 4/2018 | Takigawa et al. | |
| 9,971,148 | B2 * | 5/2018 | Carothers ............ | G02B 26/108 |
| 2002/0003919 | A1 | 1/2002 | Morimoto | |
| 2003/0138193 | A1 | 7/2003 | Sweatt et al. | |
| 2018/0106970 | A1 * | 4/2018 | Takigawa ............. | G02B 6/3512 |
| 2018/0159299 | A1 | 6/2018 | Zhou et al. | |
| 2021/0325664 | A1 * | 10/2021 | Adams ................. | G02B 7/1805 |

OTHER PUBLICATIONS

Written Opinion of the International Searching Authority dated Aug. 18, 2022, for International Patent Application No. PCT/US2022/028974.
Office action issued in corresponding Chinese Patent Application No. 202280050678.3, mailed Apr. 29, 2026 (English translation).

* cited by examiner

Circle Traced By
Rotating Prism 360°

1399

1x4 Possible 3d arrangement out1          out2 in

1399 out4          out3

Beam May Be Pointed
Anywhere Within the Annulus

1499

1x4 Possible 3d arrangement out1    out2 in

1399 out4    out3

1x4 Possible 2d arrangement out1    out2 out4    in    out3

ROTATING BEAM SWITCH

CROSS-REFERENCE TO RELATED APPLICATION(S)

This is a National Stage Entry into the United States Patent and Trademark Office from International Patent Application No. PCT/US2022/028974, filed on May 12, 2022, which relies on and claims priority to U.S. Patent Application No. 63/194,665, filed on May 28, 2021, the entire contents of both of which are incorporated herein by reference.

FIELD OF THE INVENTION

The present disclosure relates to the field of lasers, and more particularly to systems including an optical fiber to receive a signal from a laser source.

BACKGROUND OF THE INVENTION

Fiber lasers are widely used in industrial processes (e.g., cutting, welding, cladding, heat treatment, etc.) In some fiber lasers, the optical gain medium includes one or more active optical fibers with cores doped with rare-earth element(s) The rare-earth element(s) may be optically excited ("pumped") with light from one or more semiconductor laser sources. There is great demand for high power and high efficiency diode lasers, the former for power scaling and price reduction (measured in $/Watt) and the latter for reduced energy consumption and extended lifetime.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology.

DETAILED DESCRIPTION OF EMBODIMENT(S) OF THE INVENTION

Figure 1:
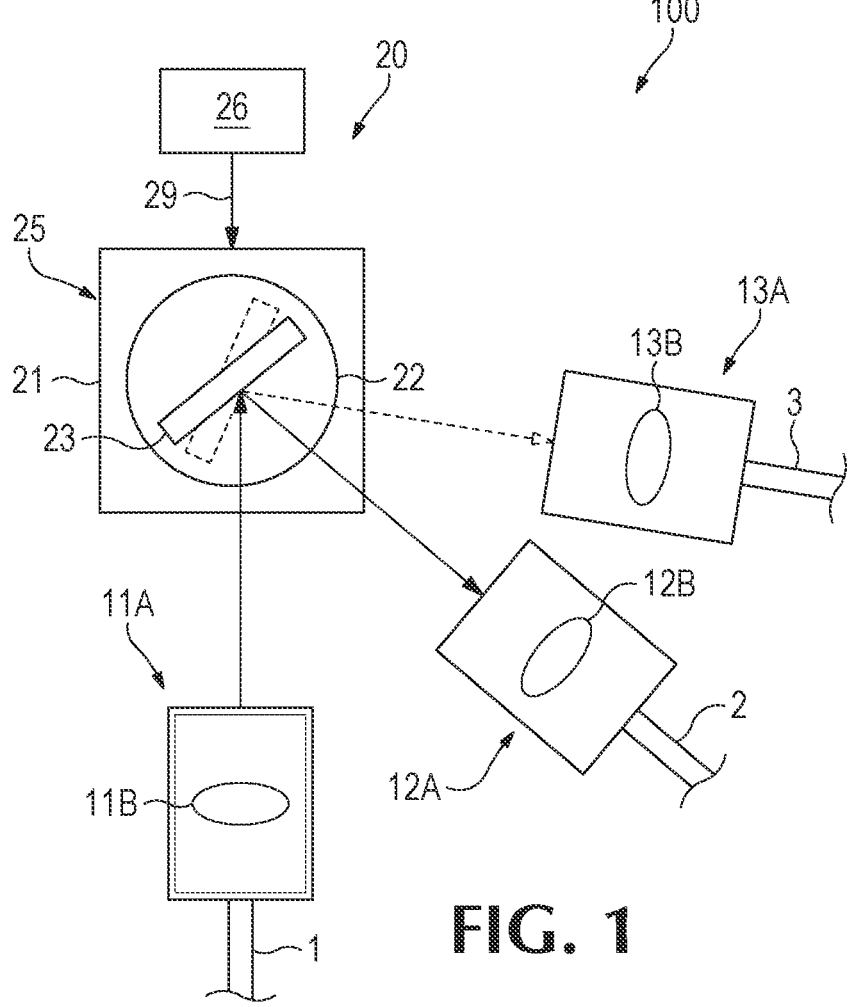
FIG. 1 illustrates a schematic diagram of a rotating reflector beam switch, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Free-space handling of high-power beams may include steering a diverging beam from one fiber by using a number of optical elements, in transmission and in reflection, and to refocus it into an input end of one or more receiving fibers in a controlled way. In one example, an output end of a transmitting fiber emits a diverging laser beam, which is then collimated by one or more lenses. Following collimation, the beam is steered by a number of fixed or moving optics, transmissive, partially transmissive and reflective, until one or more additional lenses focus the beam into an input end of a receiving fiber.

In some cases, a system can switch between more than one receiving fiber. The optical elements may switch the beam from delivering the beam into an input end of a first receiving fiber at a first time to an input end of a second receiving fiber at a second later time. Several configurations are possible, including different number of inputs, outputs, arrangement of optical components, use of transmissive, partially transmissive and reflective optics, choice of magnification factors, etc. Mirrors and connected moving parts must show a very high repeatability in order to ensure that the beam always travels the same path and is correctly refocused into the receiving fibers.

In these systems that switch as described above, the optical elements may include a mirror mounted to a linear stage. The linear stage may move away from the first receiving fiber and towards the second receiving fiber to reflect, where it is in position to reflect the beam into the second receiving fiber.

Although the linear stage may be very repeatable and accurate, a downside to the linear stage approach is the time involved to operate the linear stage (latency). To avoid this latency from the movement of the linear stage, fixed flipping mirrors may be used. In one approach, one fixed position flipping mirror is located near each receiving fiber. A first flipping mirror corresponding to the first receiving fiber is in a protracted state at the first time to reflect the beam into the input end of the first receiving fiber The first flipping mirror flips out of the protracted state, and a second flipping mirror corresponding to the second receiving fiber flips into the protracted state to reflect the beam into the input encl of the second receiving fiber. While the flipping mirrors are faster, it involves a number of moving parts which may involve downsides such as adding expense or reduced reliability.

FIG. 1 illustrates a schematic diagram of a rotating reflector beam switch 100, according to various embodiments. The beam switch 100 includes a collimation module 11A, a set of two or more receiving modules (including receiving module 12A and receiving module 13A), and a beam steering module 20. The collimation module 11A may include an optical fiber 1 that provides a diverging laser beam formed from laser light generated by a laser source (not shown), and a collimation lens 11B. Receiving modules 12A and 13A may include focusing lenses 12B and 13B to refocus the laser beam into optical fibers 2 and 3, respectively. Optical fibers 2 and 3 may be part of or coupled to feeding fibers (not shown) to output a laser beam to a workpiece. In such an application, the feeding fibers may be part of or coupled to different process heads (which may contain different optics, etc.) so that the laser beam delivered to the workpiece may have different characteristics depending on which process head is used (in this way an operator may not need to replace/swap tools on a single process head). This is just one example application—the rotating reflector beam switch 100 may be used in any application that requires beam switching, including beam monitoring.

The beam steering module 20 may include a motorized rotating stage 25 and circuitry 26 to control the motorized rotating stage 25. The motorized rotating stage 25 may have a base 21 and a rotating section such as a platform 22 (e.g., attached to the base 21 via a bearing) to rotate about a single axis at discrete predefined increments relative to the base 21 based on a control signal 29. A reflector 23 may be attached to the platform 22. Rotation of the platform 22 based on the signal 29 may rotate the reflector 23 from the illustrated position to the position shown by the dashed lines. In the new position, the reflector 23 may reflect a collimated beam output by the collimation module 11A to the receiving module 13A. The circuitry 26 may be configured to control the motorized rotation stage 25 to move the reflector 23 into a desired position based on an input selection. The input selection may be generated by a person or a system coupled to the circuitry 26 to control operation of a fiber laser on a workpiece (or to perform beam monitoring (or the like) in other embodiments).

Rotation of the platform 22 relative to the base 21 may have less latency than known beam switches that use linear stages. Also, given that the beam switch 100 may require only one moving component (the motorized rotating stage 25), the beam switch 100 may be more reliable that systems that require multiple moving components (e.g., systems that may require two or more flipping mirrors).

The modules 11A, 12A, and 13A may be fixably mounted to a same frame (or other assembly), or may be fixably attached to an operating surface using individual mounts. The beam steering module 20 may be fixably mounted to the frame (or other assembly), or may be fixably attached to an operating surface using an individual mount. The fibers 2 and 3 may be part of, or coupled to, movable components (e.g., process heads), respectively, even though the position of the modules 12A and 13A may be stationary. In various embodiments, each of the modules 11A, 12A, and 13A may include a port to which a respective one of the optical fibers 1, 2, and 3 may be coupled.

Arms may be used to hold the modules 11A, 12A, and 13A at the necessary positions in some embodiments. Any mounting structure, now known or later developed, may be used to hold the modules 11A, 12A, and 13A at the necessary positions and/or anchor the optical fibers 1, 2, and 3 to the operating surface or any frame/assembly.

The reflector 23 may be a mirror, which may be attached to the platform 22 using any attachment mechanism. In some embodiments, the reflector 23 may be attached using any adjustable reflector mount, now known or later developed. In some embodiments, the adjustable reflector mount may have a lower section to fasten to the platform 22 and an upper section having a first side coupled to the lower section and a second different side configured to receive a back side of the reflector 23, where the upper section is hingably or pivotally movable with respect to the lower section. The adjustable reflector mount may allow adjustment of the reflector 23 to permit different mounting locations for the modules 11A, 12A, and 13A. Once the adjustable reflector mount is adjusted and the mounting locations provided (e.g., during setup/assembly), further movement of the reflector 23 may be restricted during beam switching operations.

In some embodiments, the reflector 23 may be a dielectric mirror or a metallic mirror. A dielectric mirror may reflect in the infrared region (e.g., around 1070 nm) while passing visible light (thus the dielectric mirror may appear transparent). The reflector 23 may have a planar surface and may be any shape (in some embodiments, the reflector 23 may be rectangular in shape, with or without chamfers).

Figure 2:
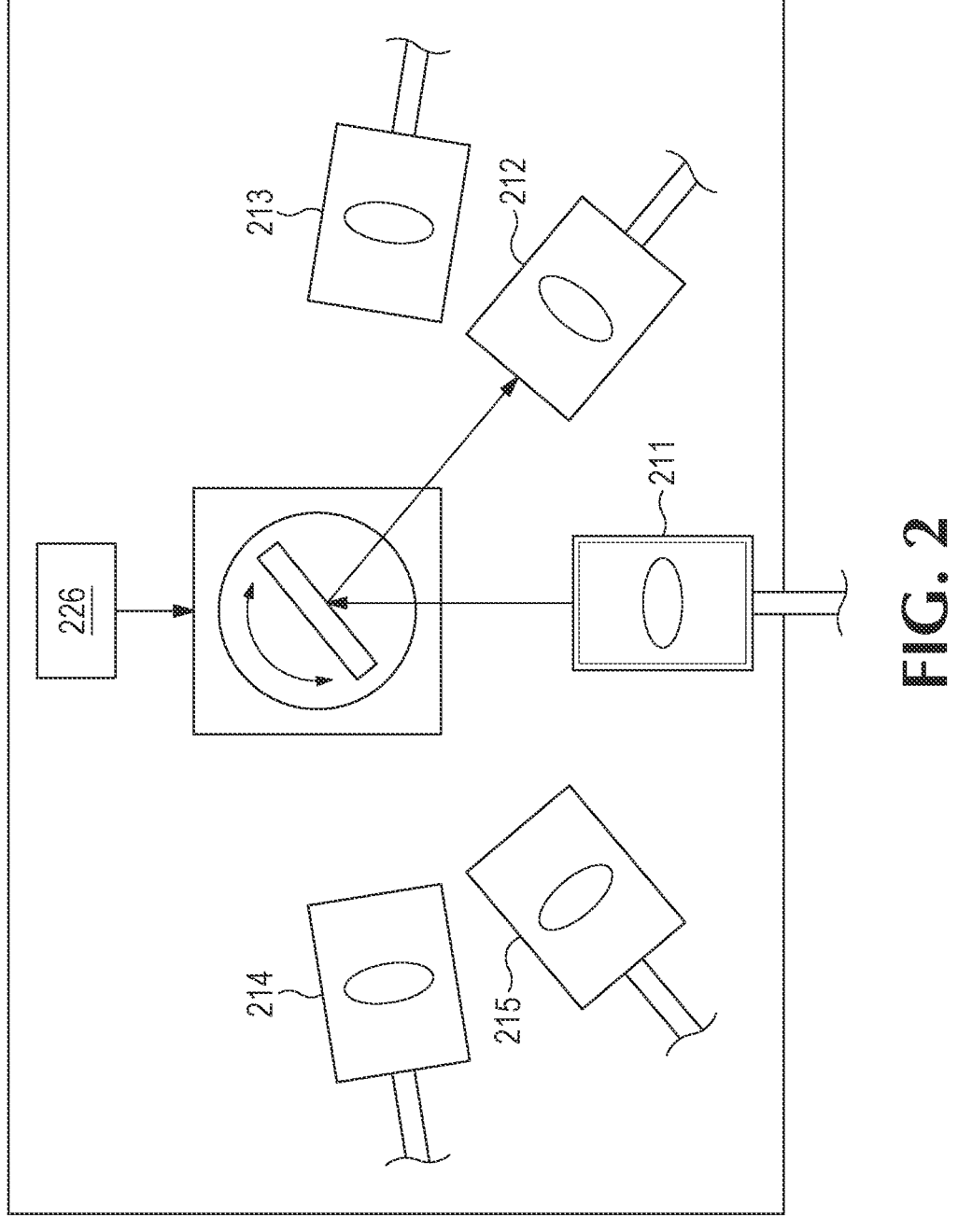
FIG. 2 illustrates a schematic diagram of another rotating reflector beam switch, according to various embodiments.

In the illustrated embodiment, two receiving modules 12A and 13A are illustrated on a same side of the collimation module 11A for brevity. It should be appreciated that any number of receiving modules may be used, and these receiving modules may be located on both sides of the collimation module 11A. FIG. 2 illustrates one such example—where receiving modules 212, 213, 214, and 215 are provided on either side of the collimating module 211. The other components, including the circuitry 226, may be similar to the to the corresponding components in FIG. 1 in any respect.

Referring again to FIG. 1, in some embodiments a system similar to system 100 may have one or more receiving modules each with a focusing lens and one or more other receiving modules that may have a function different than the one or more receiving modules with the focusing lens(es) The other receiving module(s) may not focus the beam into a fiber (e.g., may not have a focusing lens), but instead may have other functions such as monitoring (e.g., power measurement) or beam dumping (shutter function). Such a system may perform beam switching between the receiving module(s) with the focusing lens(es) and the other one or more receiving module(s) similar to how system 100 switches between receiving modules 12A and 13A.

Figure 3:
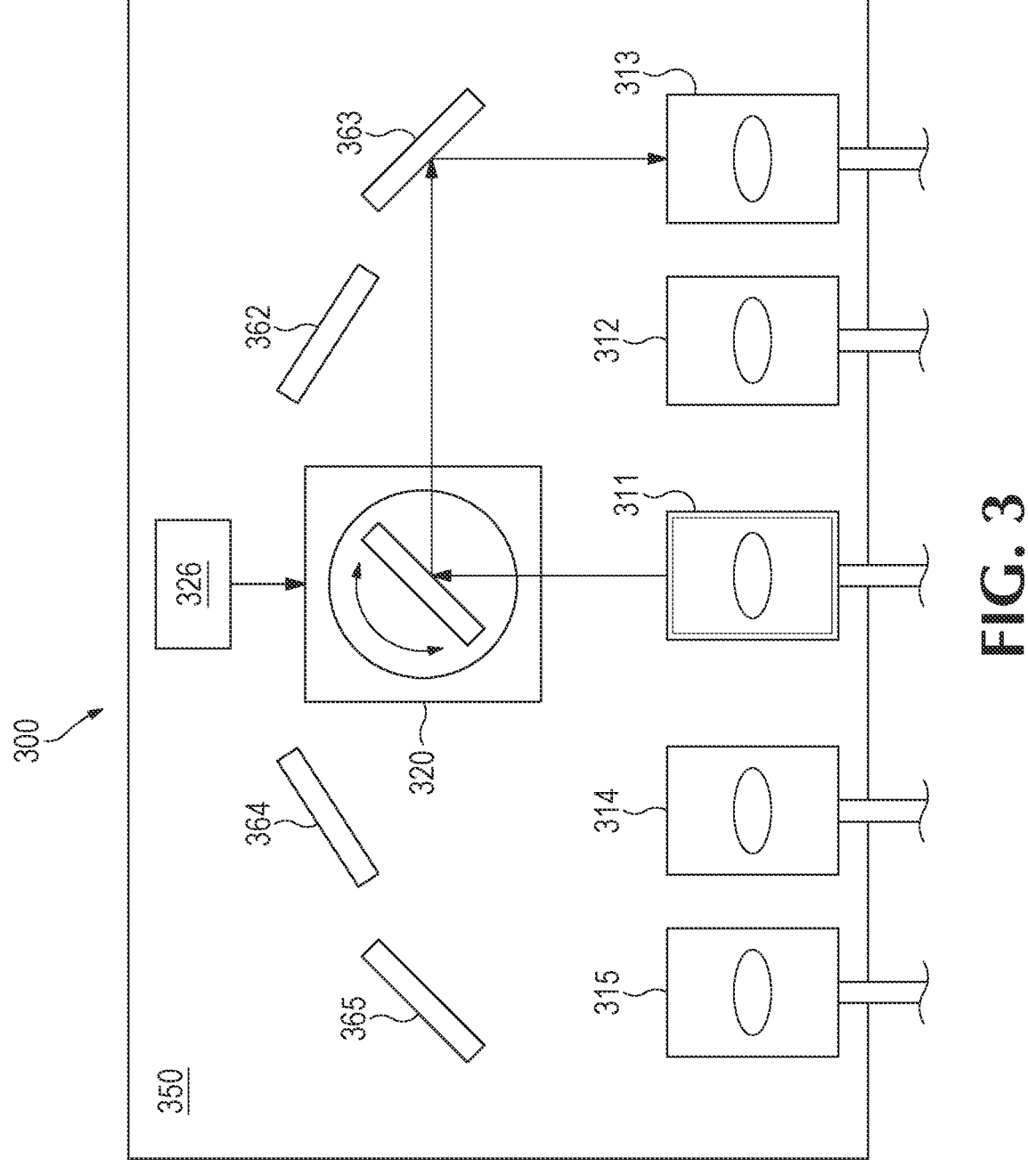
FIG. 3 illustrates a schematic diagram of a rotating reflector beam switch with additional reflectors, according to various embodiments.

FIG. 3 illustrates a schematic diagram of another rotating reflector beam switch 300 with additional fixed reflectors, according to various embodiments. The beam steering module 320 may be similar in any respect to beam steering module 20 (FIG. 1). The collimation module 311 may be similar in any respect to collimation module 11A (FIG. 1) The receiving modules 312-315 may be similar in any respect to receiving modules 12A and 13A (FIG. 1). The circuitry 326 may be similar in any respect to the circuitry 26 (FIG. 1).

The rotating reflector beam switch 300 includes additional reflectors 362, 363, 364, and 365, which may be fixed mirrors. Using the additional reflectors 362, 363, 364, and 365, the modules 311-315 may be arranged in a row, which may simplify management of their individual fibers (not shown).

These additional reflectors 362, 363, 364, and 365 may be mounted to a same base structure 350 as the modules 311-315, although this is not required. In other examples, some of the components may be mounted to one or more frames/assemblies that are mounted to an operating surface and/or may be directly mounted to the operating surface In some embodiments, the additional reflectors 362, 363, 364, and 365 may be fixably mounted to the platform 350, or mounted using any adjustable reflector mount such as any adjustable reflector mount previously described herein. In these examples the additional reflectors 362, 363, 364, and 365 may be adjusted during setup (the additional reflectors 362, 363, 364, and 365 may remain in the same position during beam switching operations).

In various embodiments, any further optical components (e.g., further additional reflectors or some other optical component) may be located on the optical paths between the module 320 and the modules 312-315. Also, additional reflectors or some other optical component may be located on the optical path between the modules 311 and 320. As such, a beam may be processed by a series of optical components, any of which may be adjusted during setup. The arrangement of optical components may be, such that, when the beam is processed it is directed towards each of the modules 312-315, its axis may be coincident (or as close to possible) to that of the focusing lenses of the modules 312-315.

Figure 4:
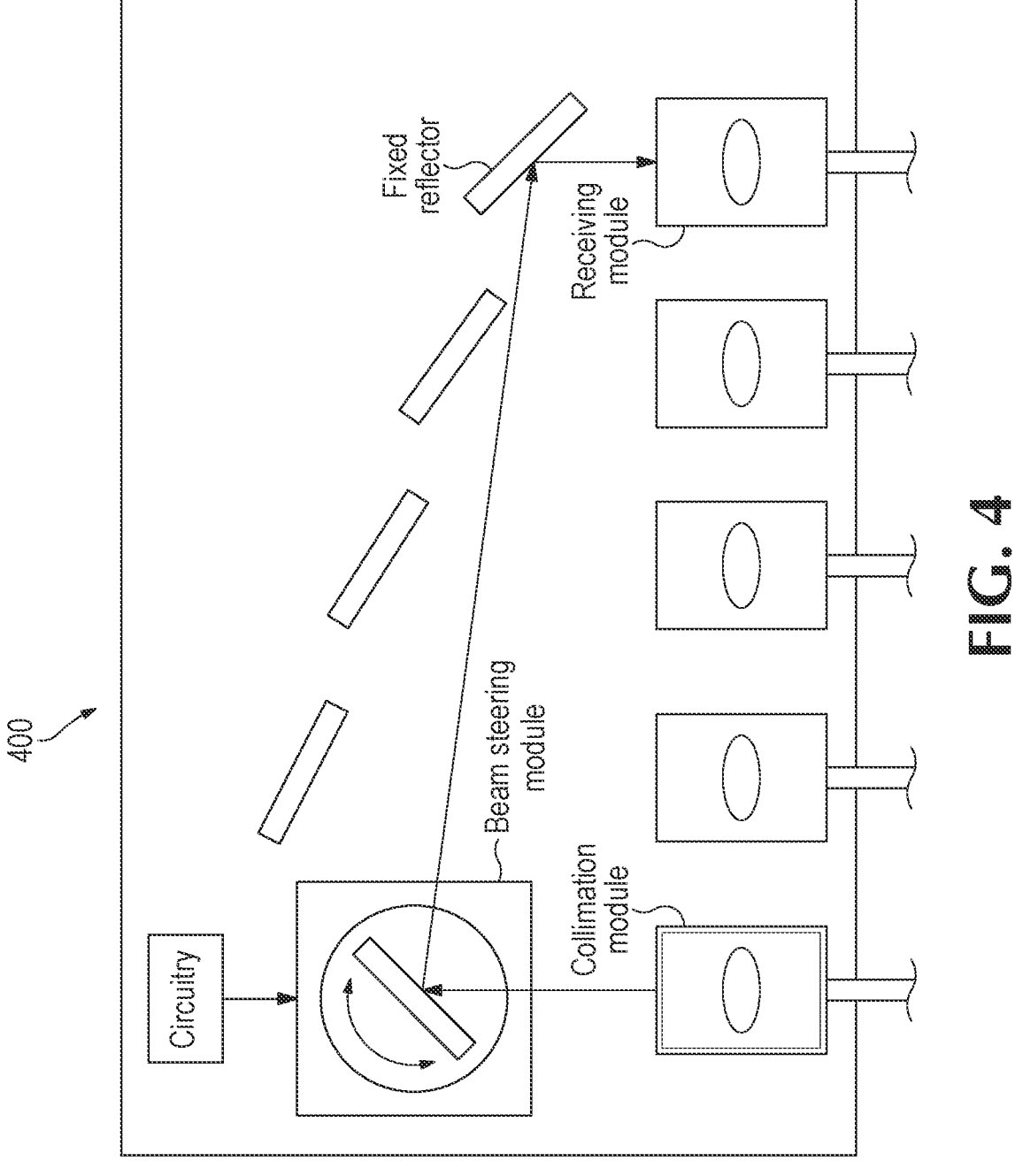
FIG. 4 illustrates a schematic diagram of another rotating reflector beam switch with additional reflectors, according to various embodiments.

FIG. 4 illustrates another rotating reflector beam switch 300 with additional reflectors in which the receiving modules are arranged in a row on one side of the collimation module. The illustrated components may be similar to their corresponding components in any of FIGS. 1-3 in any respect.

Comparing the arrangement of FIGS. 1 and 2 to the arrangement of FIGS. 3 and 4, the former may avoid additional reflectors and thus lower cost. On the other hand, the arrangements of FIGS. 3 and 4 may provide additional degrees of freedom compared to the arrangements of FIGS. 1 and 2, whereby small differences in the pointing of the focusing stages may be compensated using the additional optical components allowing for placement with improved accuracy in order to reach the desired fiber to fiber coupling efficiency.

Figure 5:
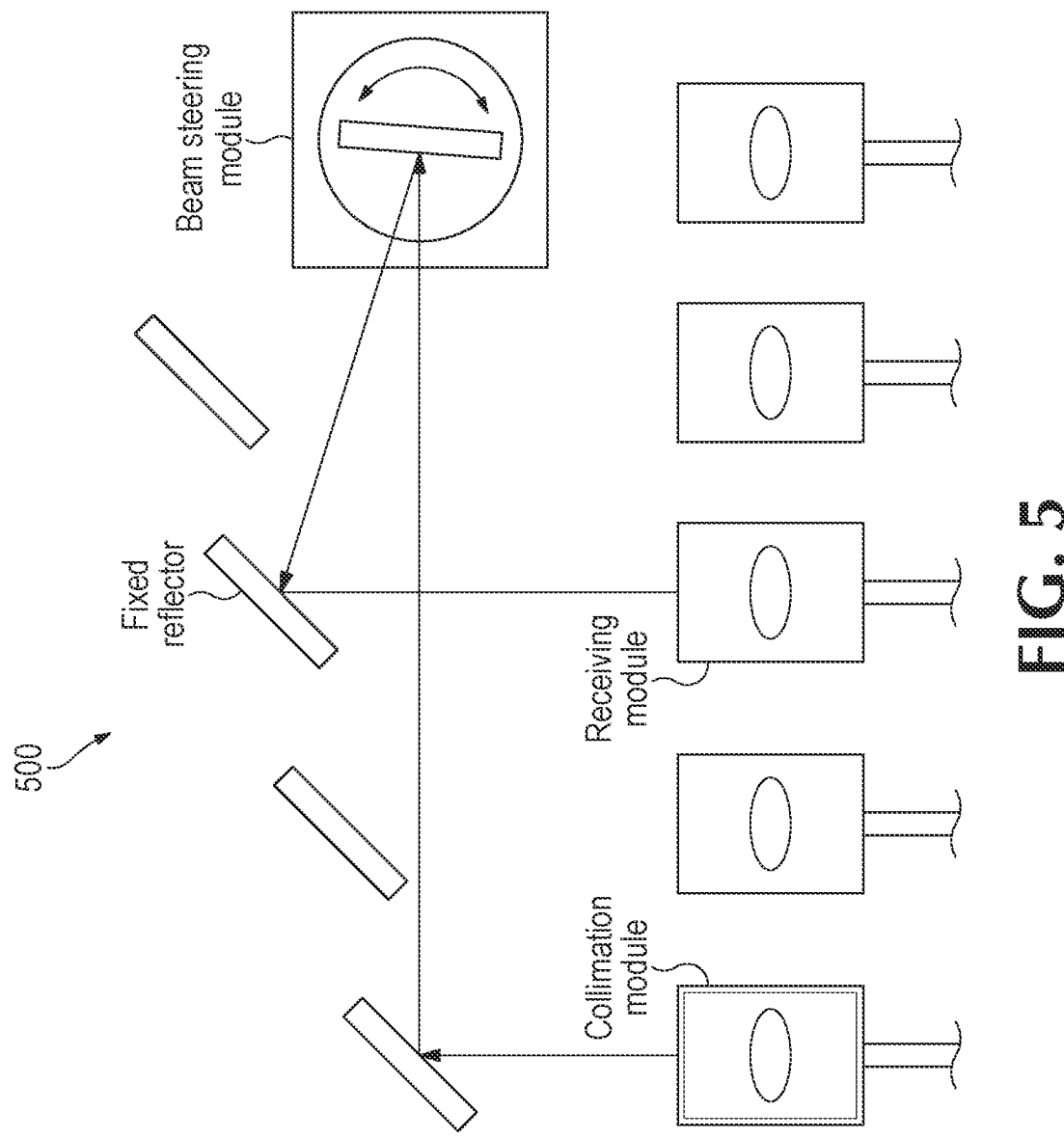
FIG. 5 illustrates a rotating reflector beam switch with low scan angles, according to various embodiments.
Figure 6:
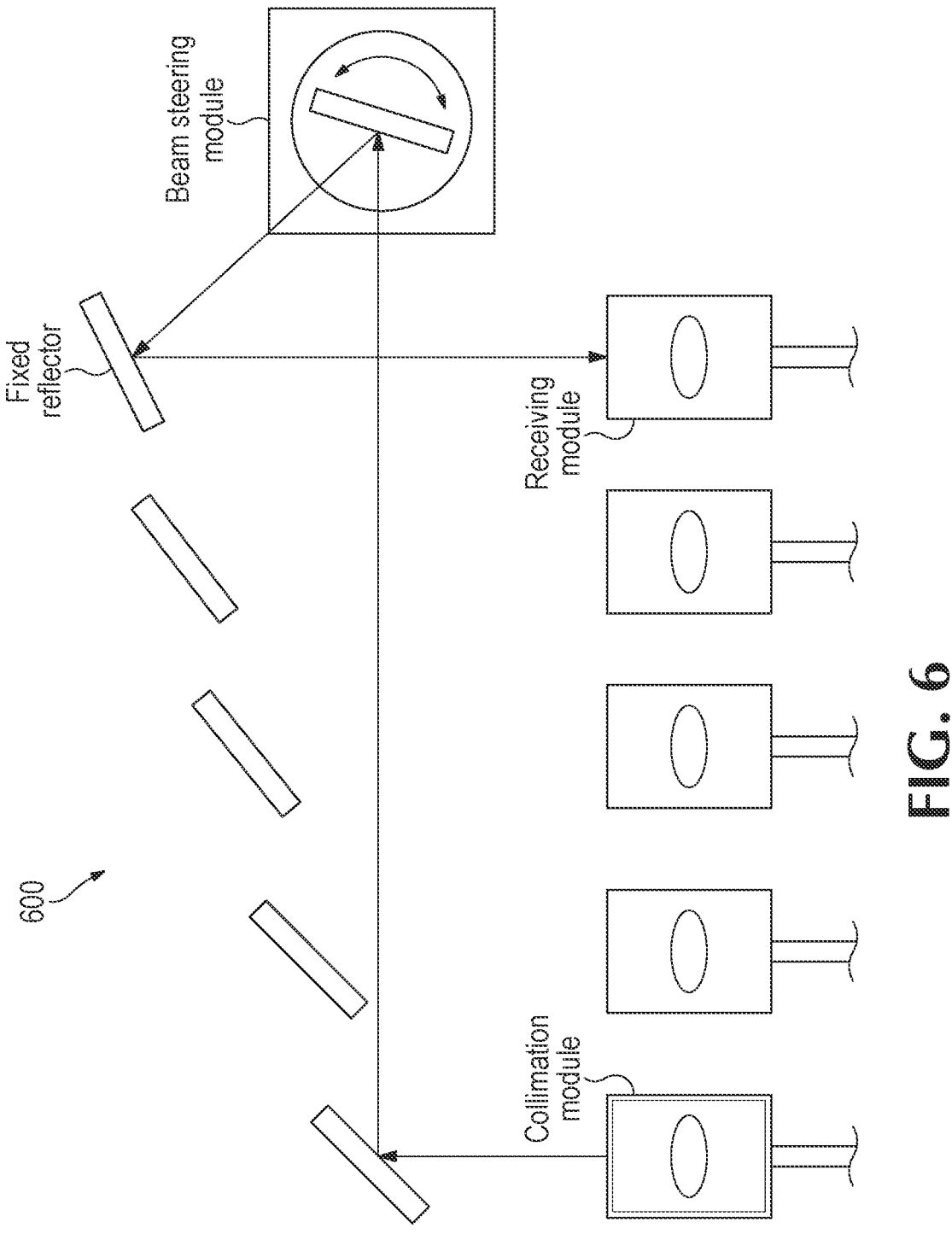
FIG. 6 illustrates another rotating reflector beam switch with low scan angles, according to various embodiments.

FIG. 5 illustrates a rotating reflector beam switch 500 with low scan angles (e.g., acute angles that are 45 degrees or less), according to various embodiments. Incident angles corresponding to the beam steering module's reflector (scan angles) are no greater than forty five degrees (low scan angle), according to various embodiments. This arrangement, with the low scan angle, may allow various high reflective coatings to be used on the reflecting surface of the beam steering module's reflector FIG. 6 illustrates another rotating reflector beam switch 600 with low scan angles, according to various embodiments. The reflector beam switch 600 includes a reflector on the optical path between the collimation module and the beam steering module.

Figure 7:
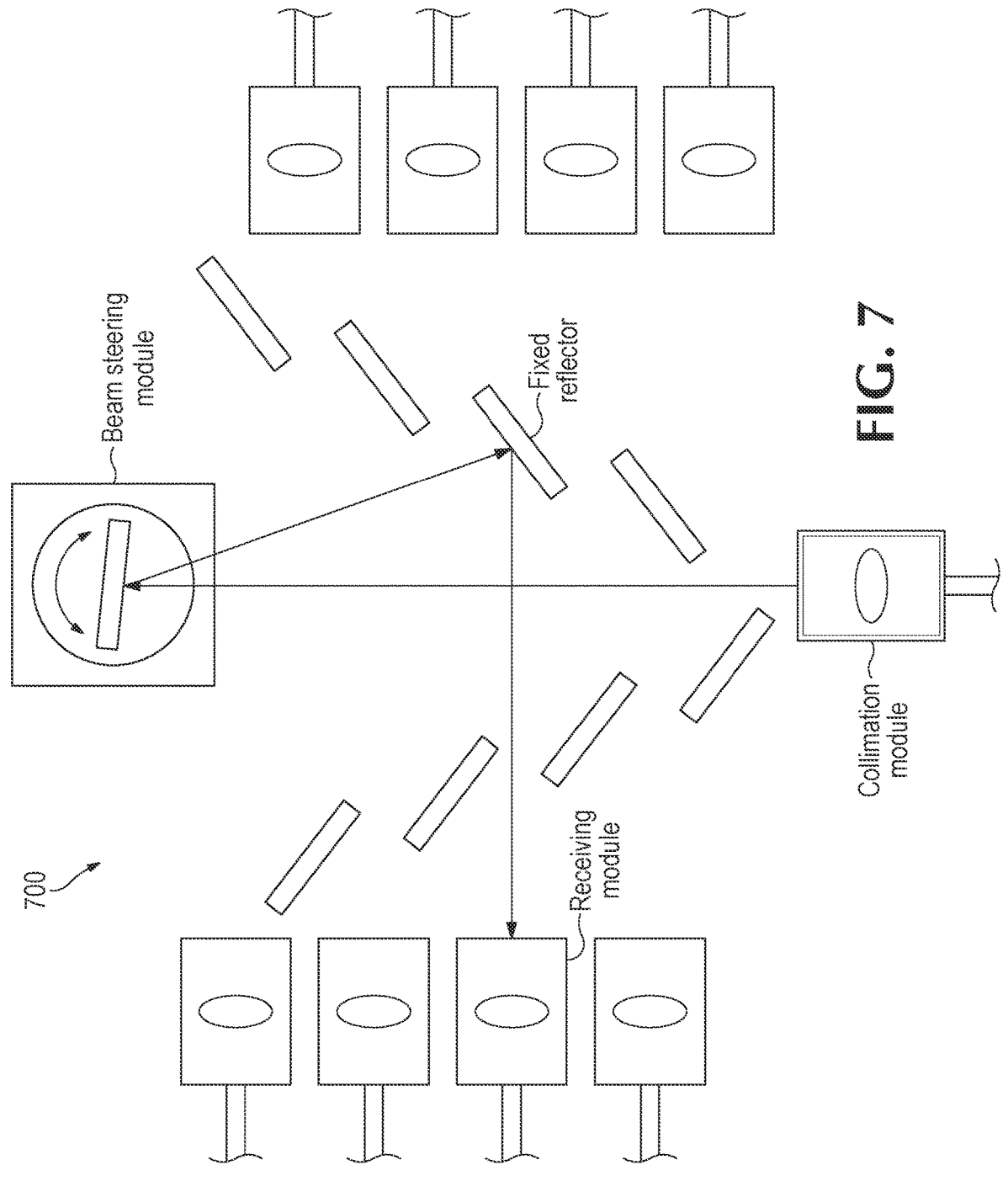
FIG. 7 illustrates another rotating reflector beam switch with low scan angles, according to various embodiments.
Figure 8:
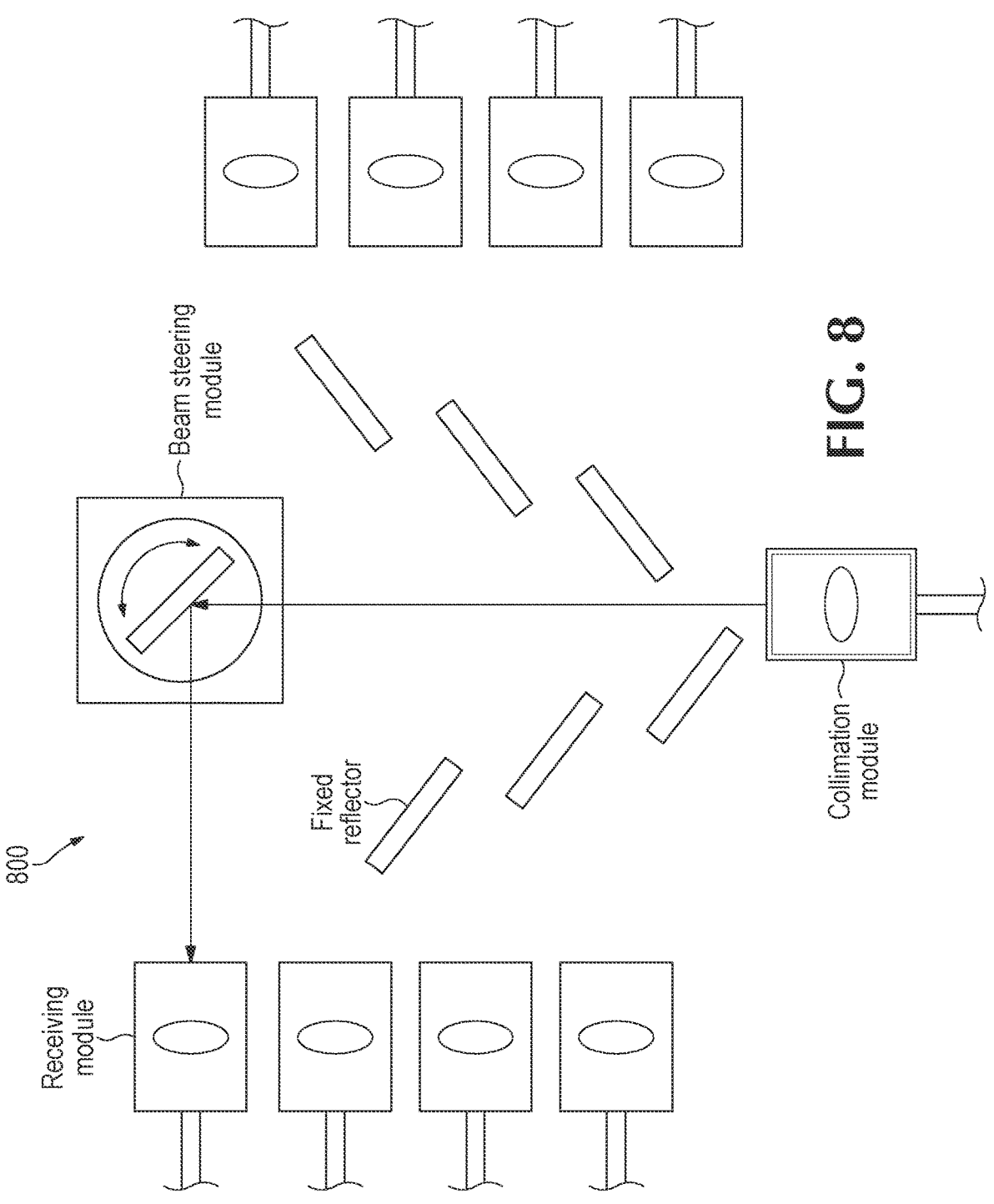
FIG. 8 illustrates a rotating reflector beam switch with wider scan angles, but with fewer fixed reflectors, according to various embodiments.

FIG. 7 illustrates another rotating reflector beam switch 700 with low scan angles. This reflector beam switch 700 has interleaved optical fibers of the receiving modules. FIG. 8 illustrates a reflector beam switch 800 with wider scan angles (e.g., not restricted to 45 degrees or less), but with fewer fixed reflectors.

Figure 9:
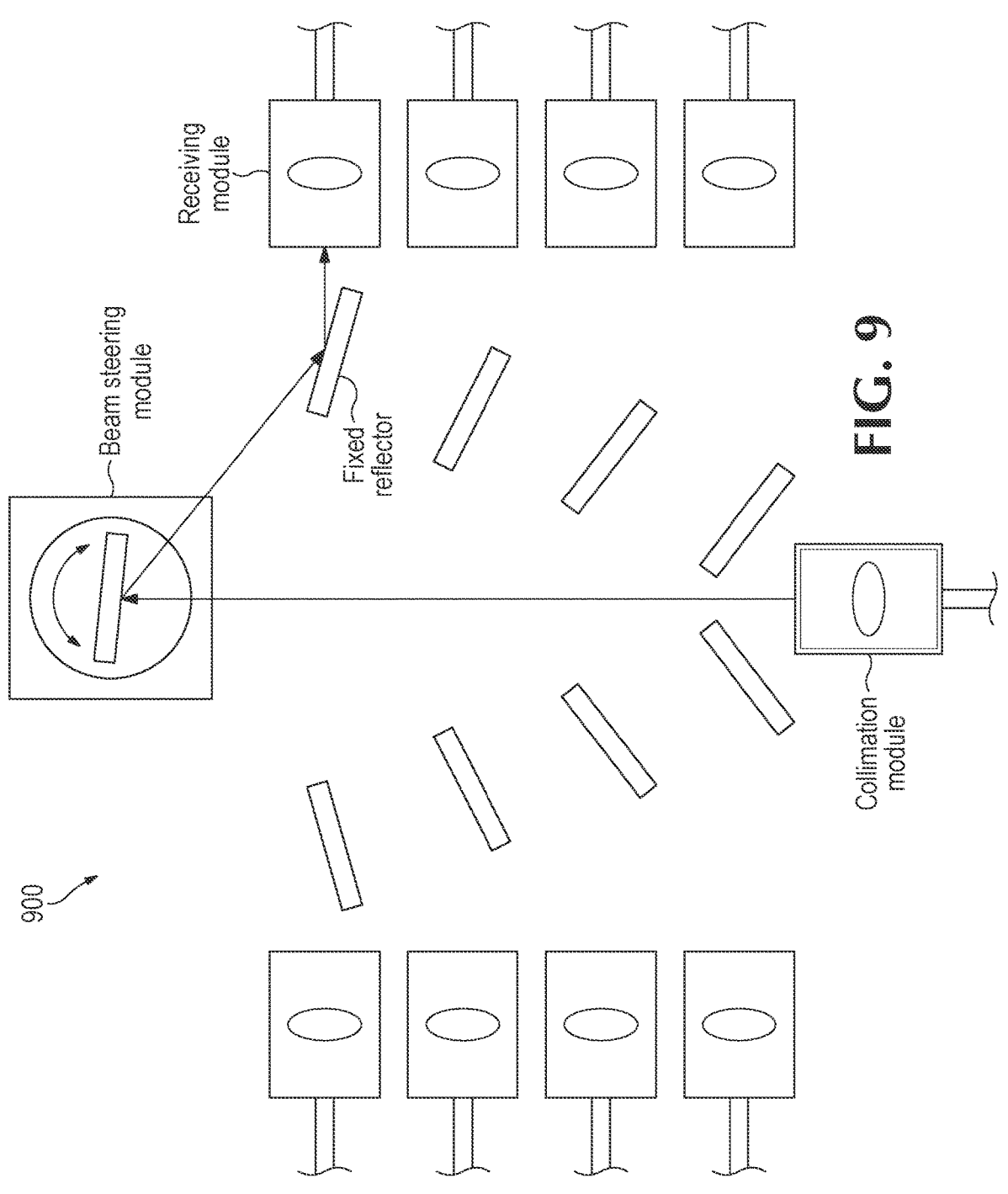
FIG. 9 illustrates another rotating reflector beam switch with a low scan angle and two rows of receiving modules, according to various embodiments.
Figure 10:
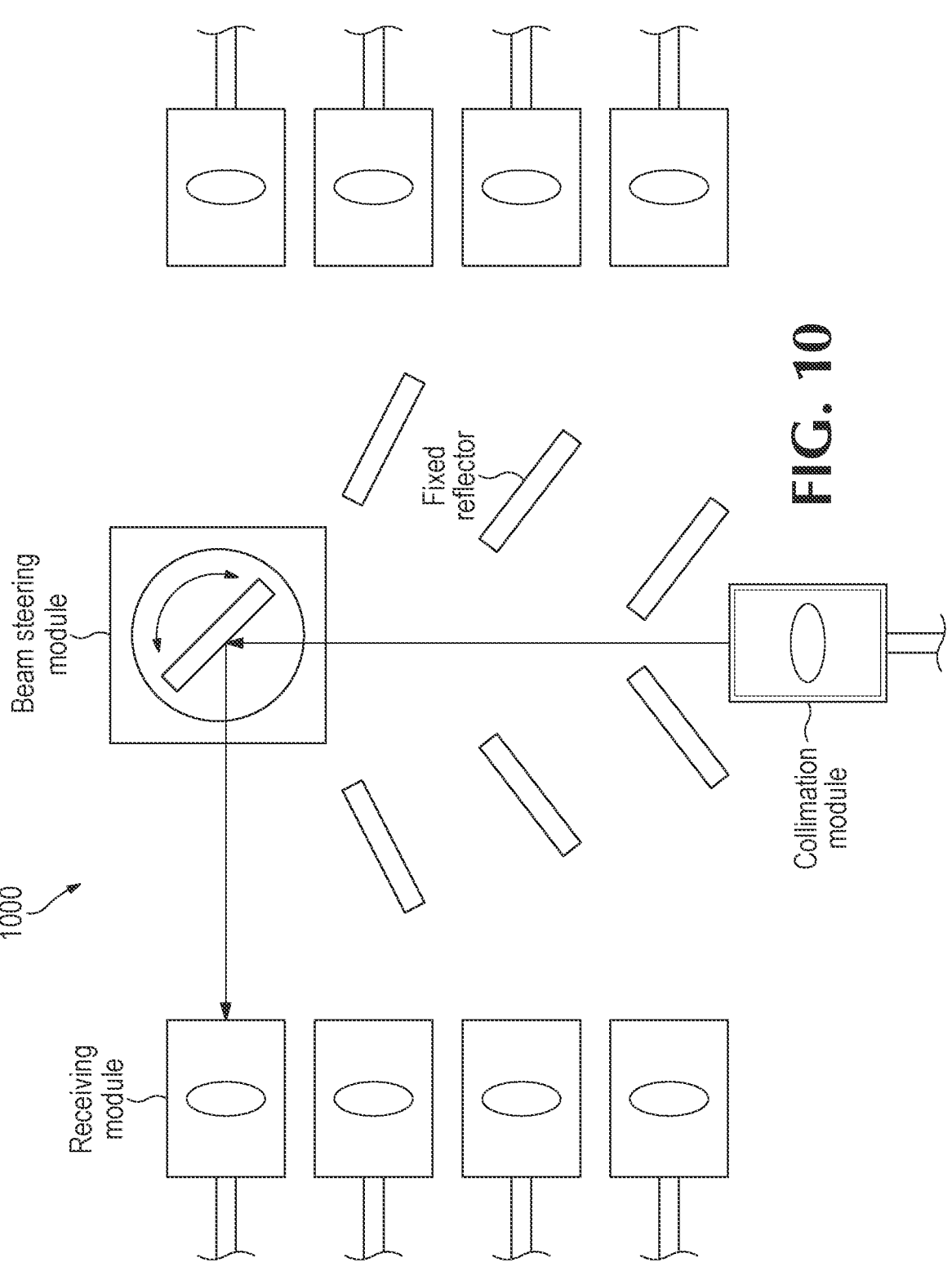
FIG. 10 illustrates another rotating reflector beam switch with a wider scan angle, but fewer fixed reflectors, according to various embodiments.
Figure 11:
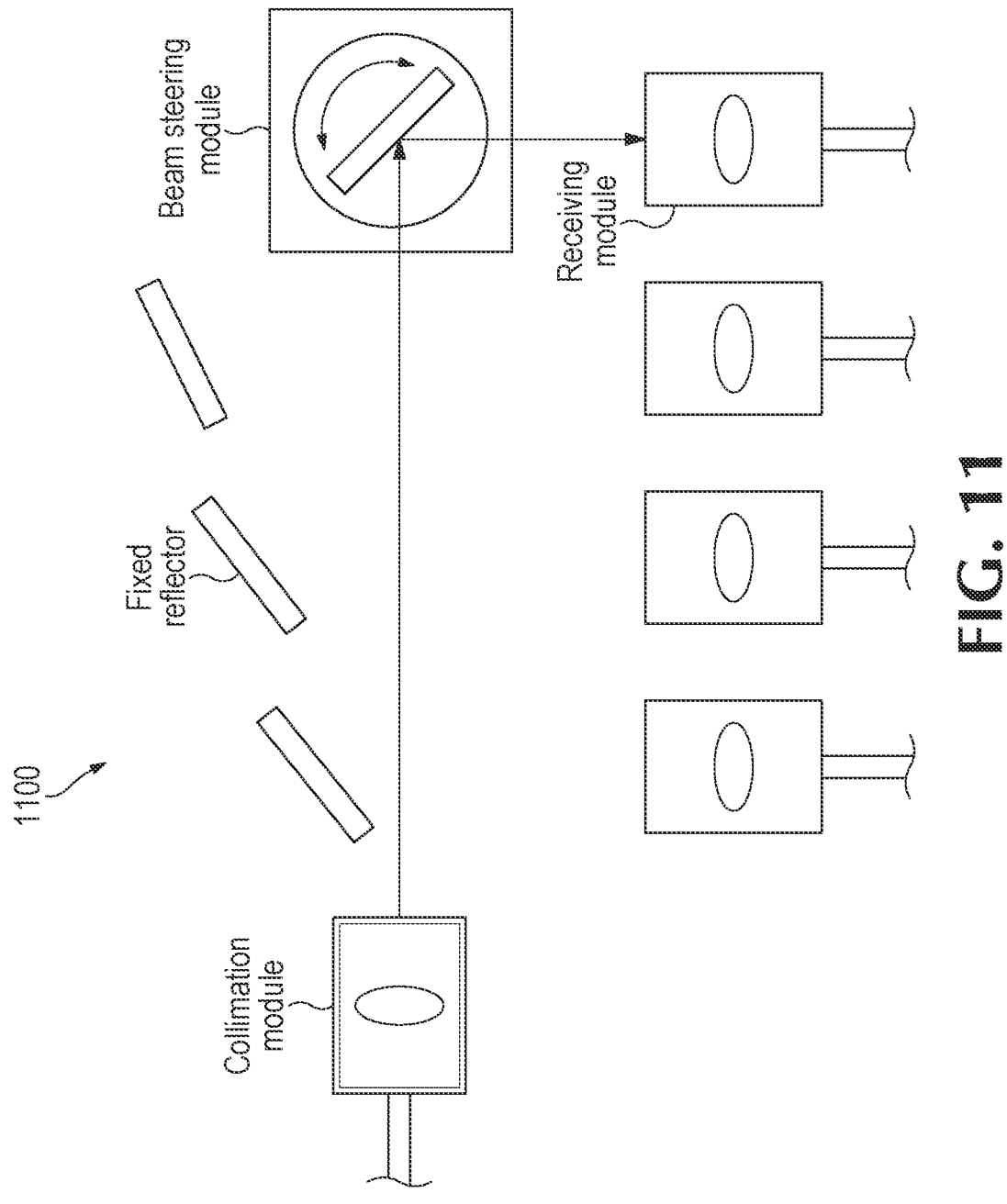
FIGS. 11 and 12 illustrate rotating reflector beam switches in which the collimating module is at ninety degrees with respect to each of the receiving modules, according to various embodiments.
Figure 12:
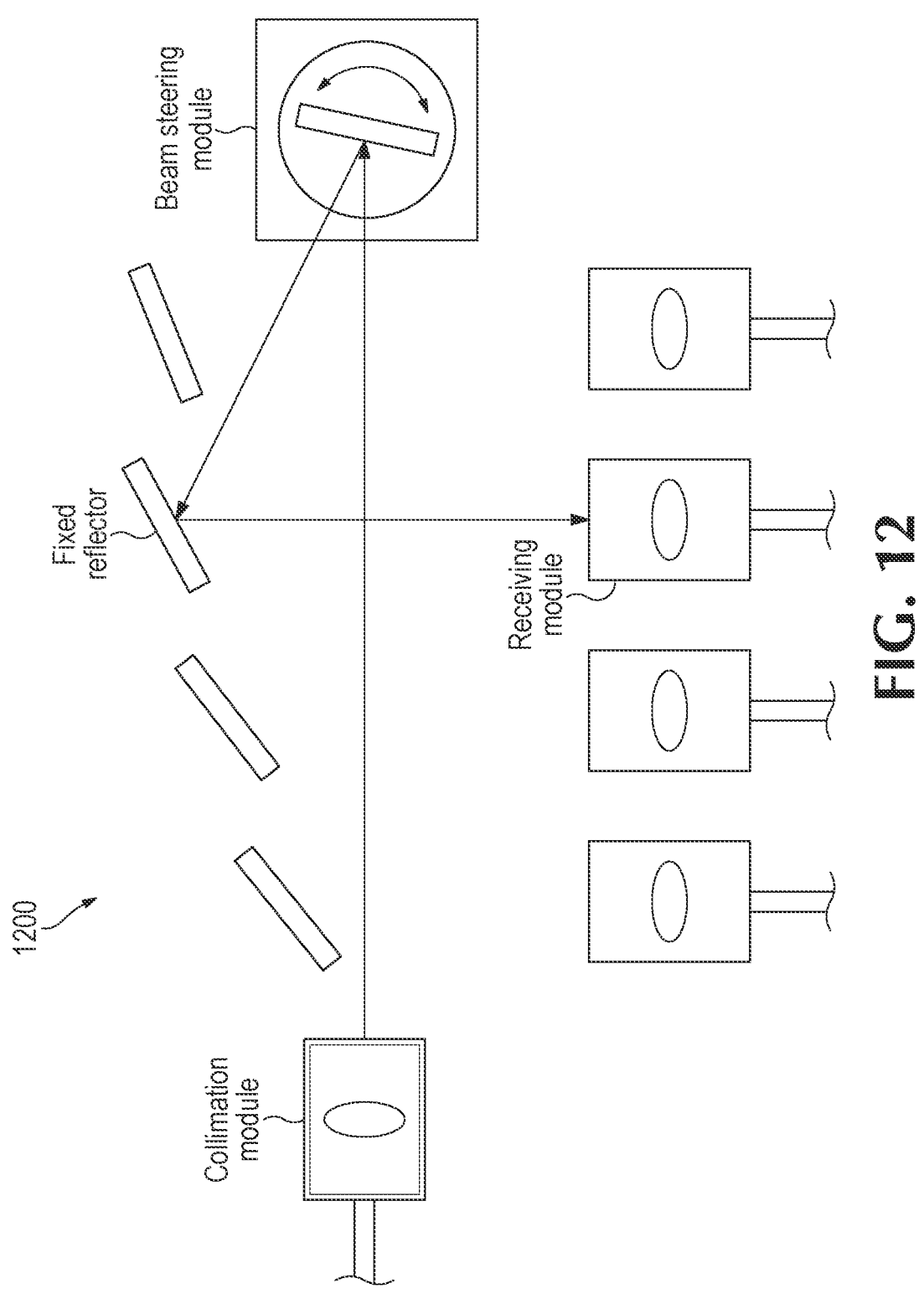

FIG. 9 illustrates another rotating reflector beam switch 900 with a low scan angle and two rows of receiving modules. FIG. 10 illustrates another reflector beam switch 1000 with a wider scan angle, but fewer fixed reflectors. FIGS. 11 and 12 illustrate rotating reflector beam switches 1100 and 1200, respectively, in which the collimating module is at ninety degree with respect to each of the receiving modules.

Referring again to FIG. 1, the circuitry 26 (or any other circuitry described herein) may be implemented using application-specific hardware or general purpose hardware to execute instructions (e.g., hardware such as a general purpose processor and associated software). We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting encl of the transmission, or the receiving encl, or both.

Rotating Refraction Beam Switch

Figure 13A:
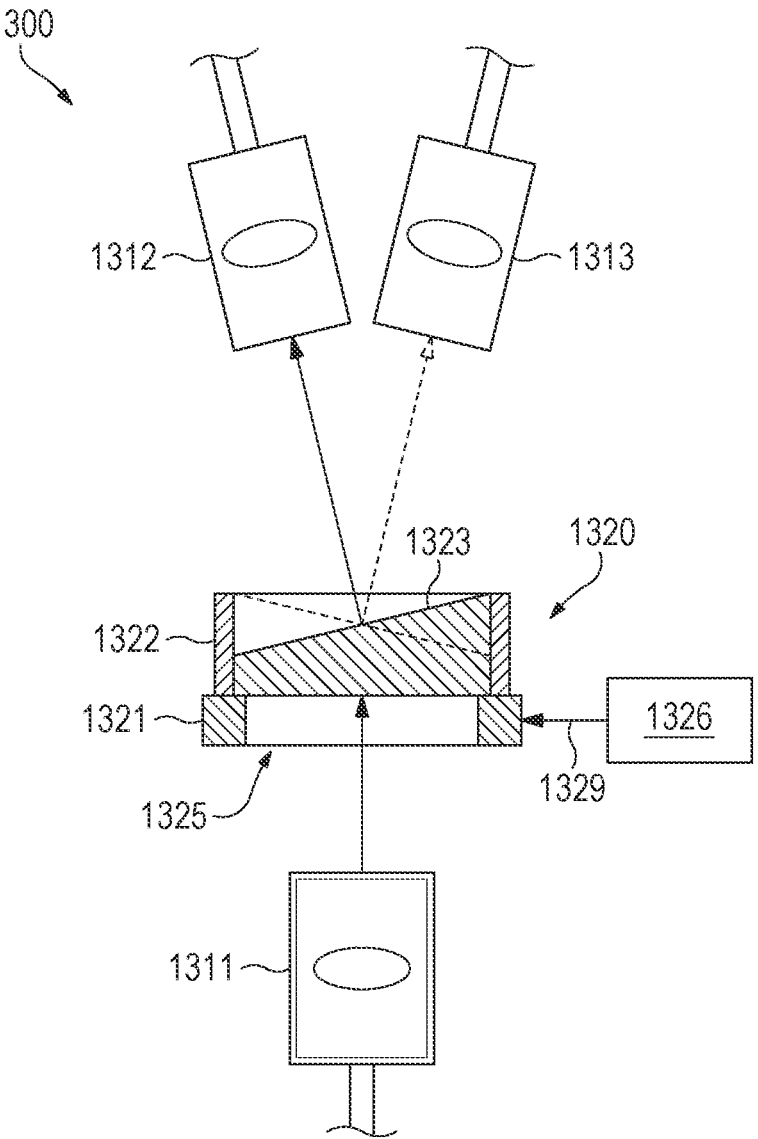
FIG. 13A illustrates a schematic diagram of a rotating refraction beam switch, according to various embodiments.

FIG. 13A illustrates a schematic diagram of a rotating refraction beam switch 1300, according to various embodiments. The beam switch 1300 includes a collimation module 1311, a set of two or more receiving modules (including receiving module 1312 and receiving module 1313), and a beam steering module 1320. The modules 1311, 1312, and 1313 may be similar in any respect to the modules 11A, 12A, and 13A (FIG. 1), or any other module described herein.

The beam steering module 1320 may include a motorized rotating stage 1325 and circuitry 1326 to control the motorized rotating stage 1325. The motorized rotating stage 1325, which is illustrated cross-sectionally, may have a base 1321 and a rotating section such as a frame 1322 (e.g., attached to the base 1321 via a bearing) to rotate about a single axis at discrete predefined increments relative to the base 1321 based on a control signal 1329. A wedge prism 1323 (e.g., a Risley prism) may be attached to the frame 1322. Rotation of the frame 1322 based on the signal 1329 may rotate the wedge prism 1323 from the illustrated position to the position shown by the dashed lines. In the new position, the wedge prism 1323 may refract a collimated beam output by the collimation module 1311 to the receiving module 1313.

The circuitry 1326 may be configured to control the motorized rotation stage 1325 to move the wedge prism 1323 into a desired position based on an input selection. The input selection may be generated by a person or a system coupled to the circuitry 1326 to control operation of a fiber laser on a workpiece, or to perform beam monitoring (or the like) in other embodiments.

Rotation of the frame 1322 relative to the base 1321 may have less latency than known beam switches that use linear stages. Also, given that the beam switch 1300 may require only one moving component (the motorized rotating stage 1325), the beam switch 1300 may be more reliable than systems that require multiple moving components (e.g., systems that may require two or more flipping mirrors).

The modules 1311, 1312, and 1313 may be fixably mounted to a same frame (or other assembly), or may be fixably attached to an operating surface using individual mounts. The beam steering module 1320 may be fixably mounted to the frame (or other assembly), or may be fixably attached to an operating surface using an individual mount. Optical fibers of the modules 1312 and 1313 may be part of, or coupled to, movable components (e.g., process heads), respectively, even though the position of the modules 1312 and 1313 may be stationary.

Arms may be used to hold the modules 1311, 1312, and 1313 at the necessary positions in some embodiments. Any mounting structure, now known or later developed, may be used to hold the modules 1311, 1312, and 1313 at the necessary positions and/or anchor their optical fibers to the operating surface or any frame/assembly.

A wedge prism 1323 may include non-parallel surfaces, e.g., non-parallel flats, and columnar sidewall(s) (a wedge prism with a cylindrical section may have one sidewall, while other wedge prisms 1323 may have differently shaped sections such as rectangular sections may have a multi-faceted sidewall). The front surface may be arranged perpendicularly to the beam axis of the collimated beam, and the rear surface may output the collimated beam at a direction based on a rotational position of the wedge prism 1323, as illustrated.

Figure 13B:
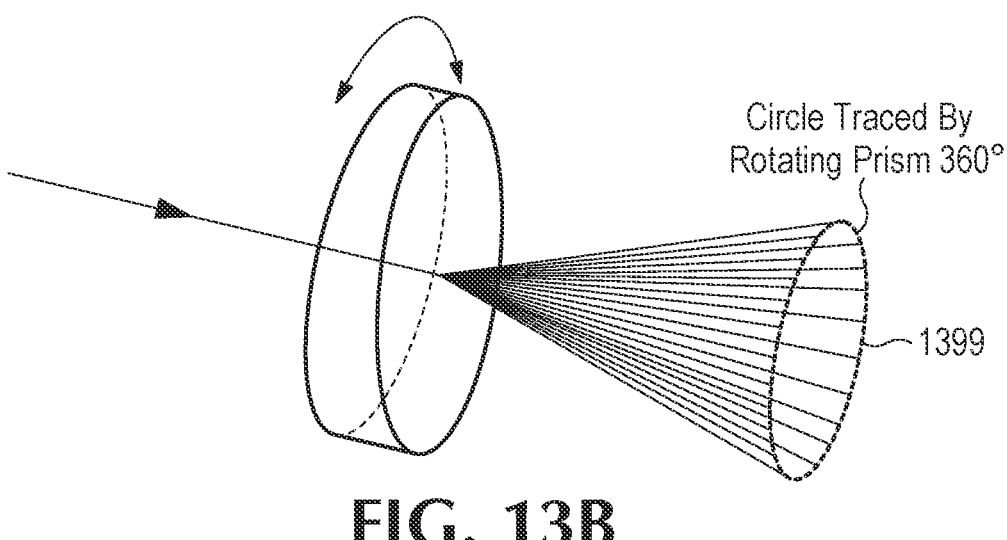
FIG. 13B illustrates a schematic diagram showing in three-dimension the possible beam paths using the rotating refraction beam switch of FIG. 13A, according to various embodiments.
Figure 13C:
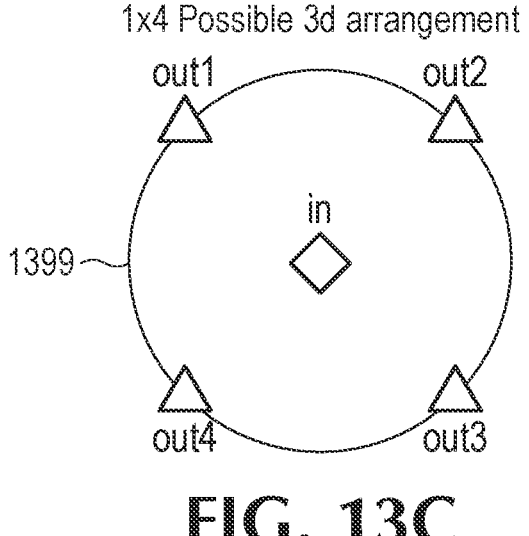
FIG. 13C illustrates a schematic diagram showing how four receiving modules may be arranged with respect to a collimation module in a rotating refraction beam switch similar to the beam switch of FIG. 13A, according to various embodiments.

The motorized rotation stage 1325 may be any rotation stage, now known or later developed. The base 1321 may have an opening through which the collimated beam passes, such as a round opening—in other examples the opening may have any shape. The motorized rotation stage 1325 may have a motor that drives rotational movement of the frame 1322 and the wedge prism 1323 relative to the base 1321. In embodiments in which the wedge prism 1323 has a cylindrical section, and the frame 1322 interfaces along an entire sidewall(s) of the wedge prism 1323, the frame 1322 may be a ring-shaped structure defining a round aperture. In other examples, it may be possible and practical for the frame 1322 to interface with only part of the sidewall(s) of the wedge prism 1323, and in these examples the aperture may have some other shape (say a rectangular aperture) and/or the frame 1322 may not enclose an aperture (the frame 1322 could have an open shape with arc sections to engage the sidewall(s) at a few locations). In other examples, the motorized rotation stage 1325 may have a platform (similar to platform 22, FIG. 1) with an aperture in the center through which the collimated beam may pass to reach the front surface of the wedge prism 1323, which may be mounted on the platform using fasteners or some other mechanism for attachment FIG. 13B illustrates a schematic diagram showing in three-dimension the possible beam paths using the rotating refraction beam switch 1300 of FIG. 13A, according to various embodiments. FIG. 13C illustrates a schematic diagram showing how four receiving modules ("out1," "out2," "out3," and "out4") may be arranged with respect to a collimation module ("in") for a rotating refraction beam switch similar to the rotating refraction beam switch 1300 of FIG. 13A, according to various embodiments. As illustrated, when there are more than the two receiving modules 1312 and 1313 (FIG. 13A), the receiving modules may be arranged at various locations on the circular path 1399.

Figures 14, 15A:
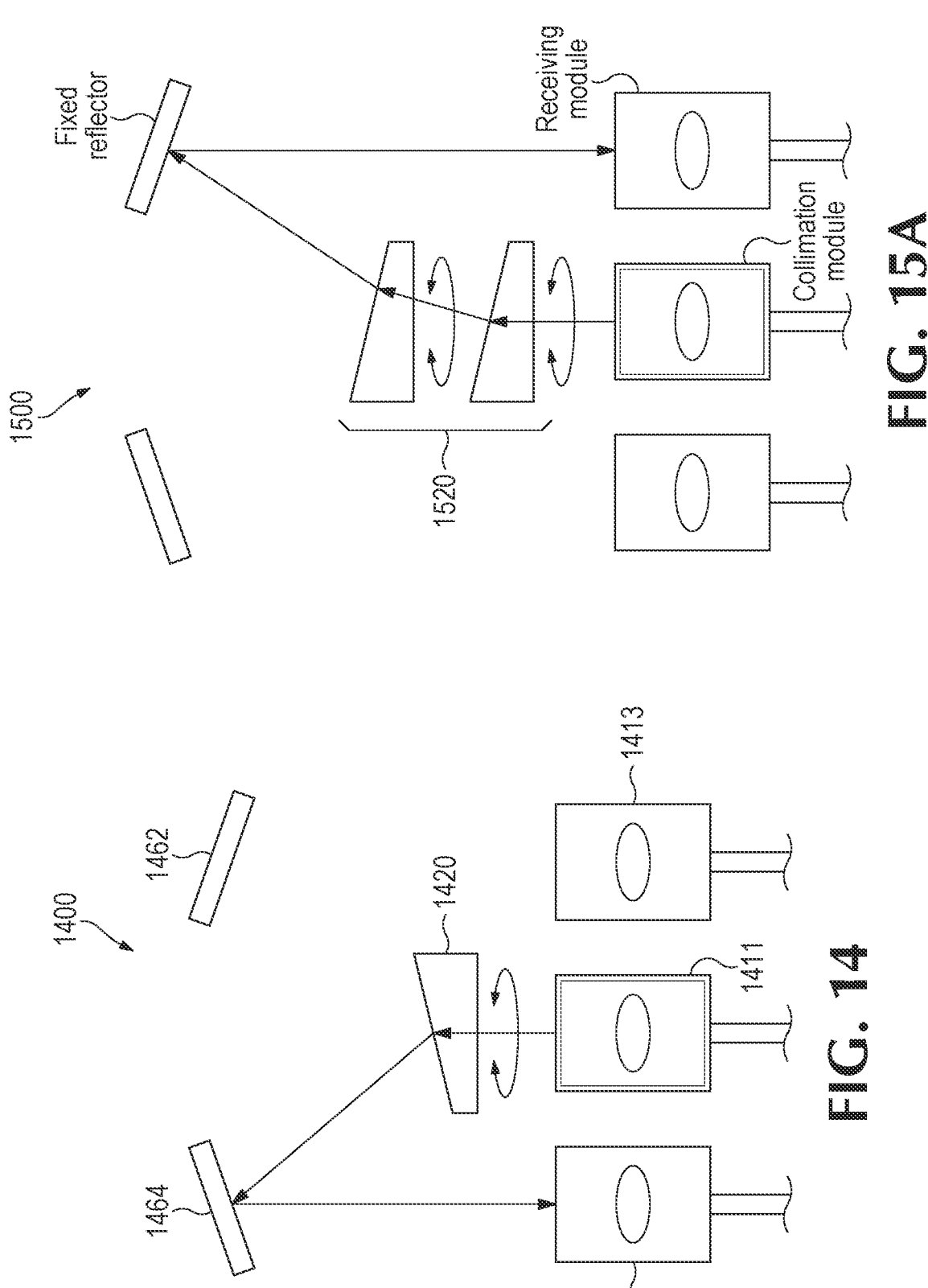
FIG. 14 illustrates a schematic diagram of a rotating refraction beam switch with reflectors, according to various embodiments.
FIG. 15A illustrates a schematic diagram of a rotating refraction beam switch with more than one wedge prism, according to various embodiments.

FIG. 14 illustrates a schematic diagram of a rotating refraction beam switch 1400 with reflectors 1462 and 1464, according to various embodiments. Beam steering module 1420 may be similar to beam steering module 1320 (FIG. 13A) in any respects. Collimation module 1411 may be similar in any respect to collimation module 1311 (FIG. 13A), and receiving modules 1412 and 1413 may be similar in any respect to receiving modules 1312 and 1313 (FIG. 13A). The reflectors 1462 and 1464 may be similar to reflectors 362 and 364 (FIG. 3). The use of the reflectors 1462 and 1464 may allow arrangement of the modules 1411, 1412, and 1413 side-by-side in a row. It should be apparent that various embodiments of a rotating refraction beam switch may be arranged similar to any rotating reflection beam switch described herein with regard to number of modules, placement, use of reflectors or other optical elements, etc.

Figure 15B:
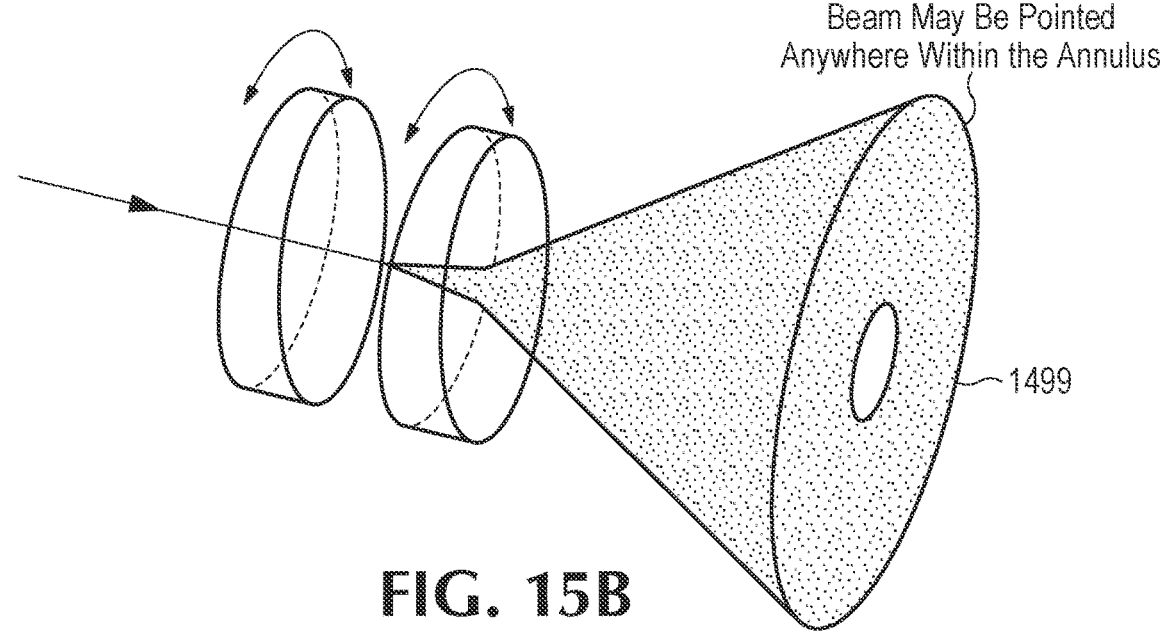
FIG. 15B illustrates a schematic diagram showing in three-dimension the possible beam paths using the beam switch of FIG. 15A, according to various embodiments.
Figure 15C:
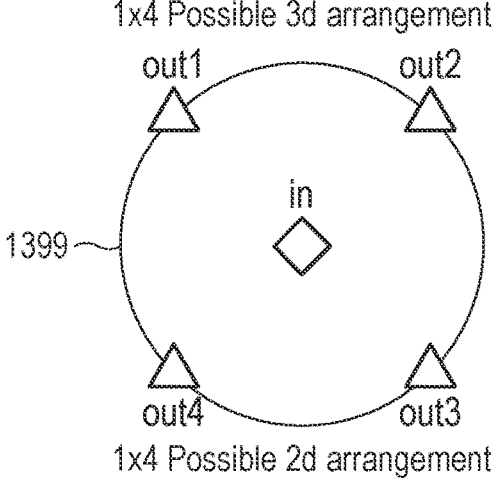
FIG. 15C illustrates a schematic diagram showing how four receiving modules may be arranged with respect to a collimation module in a rotating refraction beam switch similar to the beam switch of FIG. 15A, according to various embodiments.
Figure 15D:
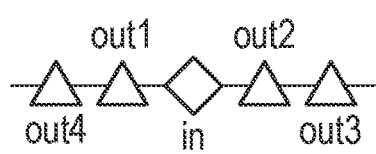
FIG. 15D illustrates a schematic diagram showing how four receiving modules may be arranged in a row in a rotating refraction beam switch similar to the beam switch of FIG. 15A, according to various embodiments.

FIG. 15A illustrates a schematic diagram of a rotating refraction beam switch 1500 with more than one edge prism, according to various embodiments. The beam steering module 1520 may have two or more of the motorized rotation stage 1325 (FIG. 13A) and two or more of the wedge prism 1323. Controller circuitry (similar to the circuitry 1326, FIG. 13A) may operate both the motorized rotation stages to direct the collimated beam to any location on an annulus on a plane perpendicular to the input beam direction. This is shown in FIG. 15B by the annulus 1499. To direct the collimated beam to an outside ring of the annulus 1499, the controller circuitry may control the motorized stages to arrange the rear faces of the wedge prisms in planes that are parallel to each other. To direct the culminated beam to an inside ring of the annulus 1499, one of the wedge prisms may be rotated, say, 170-190 degrees from the position in which the rear faces of the wedge prisms in planes are parallel to each other. This architecture can be used, with or without the reflectors 1462 and 1464 (FIG. 14), to variably locate the modules as shown in FIG. 15C and FIG. 15D (the modules identified as "in," "out1," "out2", "out3," and "out4"), or in some other arrangement.

The arrangements with a single motorized rotation stage including an optical component (e.g., a reflector or wedge prism) may have less transmission loss and/or complexity than the arrangements with more than one motorized rotation stage. However, arrangements with more than one motorized rotation stage may allow a greater range of placement locations for the receiving modules. In various embodiments, a single rotation stage/optical component or a single pair of motorized rotations stages/optical components may have reduced transmission loss and/or complexity than some known beam switches that may have one moving component per output and/or multiple moving components.

In various rotating refraction beam switch embodiments, the collimation module may be encircled by three or more receiving modules, or all the modules may be located in a row, depending on application requirements. It should be apparent that various embodiments of a rotating refraction beam switch may be arranged similar to any rotating reflection beam switch described herein.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An apparatus to steer an optical beam provided by a collimating optical module to a selected one of receiving optical modules, wherein the apparatus comprises:

an optical component to receive the optical beam provided by the collimating optical module;

a motorized rotation stage including a base and a rotating section, wherein the rotating section is restricted to rotation, relative to the base, about a single axis; and an adjustable reflector mount including:

a lower section to attach to a surface of the platform, and an upper section hingably or pivotally coupled to the lower section, the upper section including a first side coupled to the lower section and a second different side configured to receive a back side of the reflector, wherein the lower section is coupled to the platform and the back side of the reflector is affixed to the second side of the upper section, and wherein the reflector is adjustable, using the adjustable reflector mount, relative to the base in an axis that is different than the single axis;

wherein the optical component is mounted to the rotating section, and the apparatus further includes circuitry to control the motorized rotation stage to rotate the rotating section amongst different rotational positions that correspond to the receiving optical modules, respectively; and wherein the optical component guides the optical beam to the selected one of the receiving optical modules based on a current rotational position of the rotating section.

2. The apparatus of claim 1, further comprising a base structure, wherein the collimating optical module, the receiving optical module, and the motorized rotation stage are fixably mounted to the base structure.

3. The apparatus of claim 1, wherein the optical component comprises a first optical component, the apparatus further comprising second optical components corresponding to the receiving optical modules, respectively, wherein the first optical component guides the optical beam to the selected one of the receiving optical modules using a corresponding one of the second optical components.

4. The apparatus of claim 3, wherein the second optical components comprise reflectors.

5. The apparatus of claim 4, wherein the reflectors comprise fixed reflectors.

6. The apparatus of claim 4, wherein the reflectors are mounted using additional adjustable reflector mounts.

7. The apparatus of claim 6, wherein the additional adjustable reflector mounts are coupled to surfaces that are stationary with respect to the base.

8. The apparatus of claim 3, wherein the first optical component is flanked by the second optical components.

9. The apparatus of claim 1, wherein the receiving optical modules are arranged in a row, wherein the row is arranged on one side of the collimating optical module.

10. The apparatus of claim 1, wherein the optical component reflects the optical beam.

11. The apparatus of claim 10, wherein the optical component comprises a dielectric or metallic mirror.

12. The apparatus of claim 1, wherein the optical component refracts the optical beam.

13. The apparatus of claim 12, wherein the optical component comprises one or more wedge prisms.

14. The apparatus of claim 1, wherein the motorized rotation stage comprises a single motorized rotation stage or only a single pair of motorized rotation stages.

15. A rotating beam switch, comprising:

a motorized rotation stage including a base and a platform or a frame, wherein the rotating section is restricted to rotation, relative to the base, about a single axis;

means for guiding a collimated optical beam provided by a collimating optical module to a selected one of two or more receiving optical modules based on a current rotational position of the rotating section, wherein the collimated optical beam guiding means is mounted to the rotating section, and the rotating beam switch further includes circuitry to control the motorized rotation stage to rotate the rotating section amongst different rotational positions that correspond to the two or more receiving optical modules, respectively; and an adjustable reflector mount including:

a lower section to attach to a surface of the platform, and an upper section hingably or pivotally coupled to the lower section, the upper section including a first side coupled to the lower section and a second different side configured to receive a back side of the collimated optical beam guiding means, wherein the lower section is coupled to the platform and the back side of the collimated optical beam guiding means is affixed to the second side of the upper section, and wherein the collimated optical beam guiding means is adjustable, using the adjustable reflector mount, relative to the base in an axis that is different than the single axis.

16. The apparatus of claim 15, wherein at least one or the two or more receiving optical modules includes a lens and an optical fiber, the lens arranged to refocus the collimated optical beam into the optical fiber.

* * * * *